(12) United States Patent
Rokka

(10) Patent No.: US 11,850,550 B2
(45) Date of Patent: Dec. 26, 2023

(54) ARRANGEMENT FOR AND A METHOD OF OPERATING A STEAM BOILER SYSTEM

(71) Applicant: SUMITOMO SHI FW ENERGIA OY, Espoo (FI)

(72) Inventor: Antti Rokka, Espoo (FI)

(73) Assignee: SUMITOMO SHI FW ENERGIA OY, Espoo (FI)

( * ) Notice: Subject to any disclaimer, the term of this patent is extended or adjusted under 35 U.S.C. 154(b) by 23 days.

(21) Appl. No.: 17/786,258

(22) PCT Filed: Dec. 18, 2019

(86) PCT No.: PCT/EP2019/085948
§ 371 (c)(1),
(2) Date: Jun. 16, 2022

(87) PCT Pub. No.: WO2021/121575
PCT Pub. Date: Jun. 24, 2021

(65) Prior Publication Data
US 2023/0016404 A1 Jan. 19, 2023

(51) Int. Cl.
*B01D 53/34* (2006.01)
*B01D 53/86* (2006.01)
(Continued)

(52) U.S. Cl.
CPC .......... *B01D 53/343* (2013.01); *B01D 46/02* (2013.01); *B01D 53/8631* (2013.01);
(Continued)

(58) Field of Classification Search
CPC .. B01D 53/343; B01D 46/02; B01D 53/8631; B01D 53/8696; B01D 53/56;
(Continued)

(56) References Cited

U.S. PATENT DOCUMENTS 5,078,973 A  1/1992 Kuroda
5,300,270 A * 4/1994 Krigmont ............... B03C 3/013
                                                    423/239.1
(Continued)

FOREIGN PATENT DOCUMENTS

CN  205860064 U  1/2017
CN  106705090 A  5/2017
(Continued)

OTHER PUBLICATIONS

Examination Report dated Aug. 22, 2022, in corresponding Indian Patent Application No. 202247040347 (6 pages).
(Continued)

*Primary Examiner* — Timothy C Vanoy
(74) *Attorney, Agent, or Firm* — Venable LLP

(57) ABSTRACT

A method of operating and an arrangement for a steam boiler system including a furnace and along a following flue gas channel a number of superheaters, a number of economizers, and at least one air preheater located in the flue gas channel downstream of the economizers, a fabric filter baghouse located in the flue gas channel downstream of the air preheater, and downstream of the fabric filter baghouse is located a selective catalytic reduction (SCR) system including an SCR reactor, a high pressure steam coil heater upstream of the SCR reactor and a gas-gas heat exchanger connected upstream and downstream of the SCR reactor to transfer heat from flue gas after the SCR reactor to the flue gas upstream of the high pressure steam coil heater.

15 Claims, 1 Drawing Sheet

(51) Int. Cl.
*B01D 46/02* (2006.01)
*F22D 1/36* (2006.01)
*F22G 1/02* (2006.01)
*F23J 15/04* (2006.01)
*F23J 15/08* (2006.01)
*F23J 15/02* (2006.01)

(52) U.S. Cl.
CPC ........... *B01D 53/8696* (2013.01); *F22D 1/36* (2013.01); *F22G 1/02* (2013.01); *F23J 15/04* (2013.01); *F23J 15/08* (2013.01); *F23J 15/025* (2013.01); *F23J 2215/10* (2013.01)

(58) Field of Classification Search
CPC .................. B01D 53/565; B01D 53/75; B01D 2258/0283; B01D 2257/404; B01D 2257/402; B01D 46/00; F22D 1/36; F22G 1/02; F23J 15/04; F23J 15/08; F23J 15/025; F23J 2215/10
See application file for complete search history.

(56) References Cited

U.S. PATENT DOCUMENTS

| | | | |
|---|---|---|---|
| 6,395,237 | B1 | 5/2002 | Wietzke et al. |
| 7,021,248 | B2 | 4/2006 | McNertney et al. |
| 2009/0074629 | A1 | 3/2009 | Maryamchik |
| 2009/0297993 | A1 | 12/2009 | Fan et al. |
| 2016/0238245 | A1 | 8/2016 | Okomoto et al. |
| 2016/0281982 | A1 | 9/2016 | Soltys |
| 2022/0234003 | A1* | 7/2022 | Hong .................. F23J 7/00 |

FOREIGN PATENT DOCUMENTS

| | | | | |
|---|---|---|---|---|
| CN | 107 300 188 | A * | 10/2017 | ............... F22D 1/36 |
| CN | 107 525 090 | A * | 12/2017 | ............. F23J 15/006 |
| CN | 107525090 | A | 12/2017 | |
| CN | 109681889 | A1 | 4/2019 | |
| CN | 107300188 | B | 7/2019 | |
| EP | 0148741 | A1 | 7/1985 | |
| EP | 2516927 | B1 | 10/2012 | |
| EP | 3043112 | A1 | 7/2016 | |
| EP | 3 043 112 | B1 | 5/2018 | |
| JP | 2011141075 | A | 7/2011 | |
| JP | 2013506110 | A | 2/2013 | |
| JP | 2014176808 | A | 9/2014 | |
| RU | 2578564 | C2 | 3/2016 | |
| RU | 2662257 | C2 | 7/2018 | |
| WO | 2007072440 | A2 | 6/2007 | |
| WO | 2011135518 | A2 | 11/2011 | |
| WO | 2012120417 | A1 | 9/2012 | |
| WO | 2015186818 | A1 | 12/2015 | |
| WO | 2016133116 | A1 | 8/2016 | |
| WO | WO 2020 226 272 | A1 * | 11/2020 | ............. B01D 53/96 |

OTHER PUBLICATIONS

Notification of and International Search Report and Written Opinion dated Jul. 15, 2020, in corresponding International Patent Application No. PCT/EP2019/085948.
Catalysis: Selective Catalytic Reduction with Recuperative Heat Recovery, 2017, 2 pages.
Clean Air for a Better Tomorrow: Air Pollution Control, 19 pages.
Beckmann et al., "Operating Experience and Future Challenges with SCR Installations", 16 pages, Nov. 2000.
Recovery Boiler SCR-Challenge and Opportunity, Jul. 12, 2017, 7 pages.
Is De-Nox by SCR to Be the Future in US?—Technology and Tendencies Within APC-Equipment, May 2009, 6 pages.
Randall et al., "Chapter 2: Selective Catalytic Reduction", Jun. 2019, 107 pages.
The Babcock & Wilcox Company Steam, Its Generation and Use, Edition 41, 1106 pages. https://pdfcoffee.com/download/steam-its-generation-and-use-41st-edition-1pdf-2-pdf-free.html, 2005.
International Preliminary Report on Patentability, dated Jun. 30, 2022, issued in corresponding International Application No. PCT/EP2019/085948, 9 pages.
Office Action and Search Report dated Feb. 17, 2023, in corresponding Russian Patent Application No. RU2022118938 (13 pages).
Office Action dated Jun. 14, 2023, in corresponding Japanese Patent Application No. 2022-529900, with English translation (8 pages).

* cited by examiner

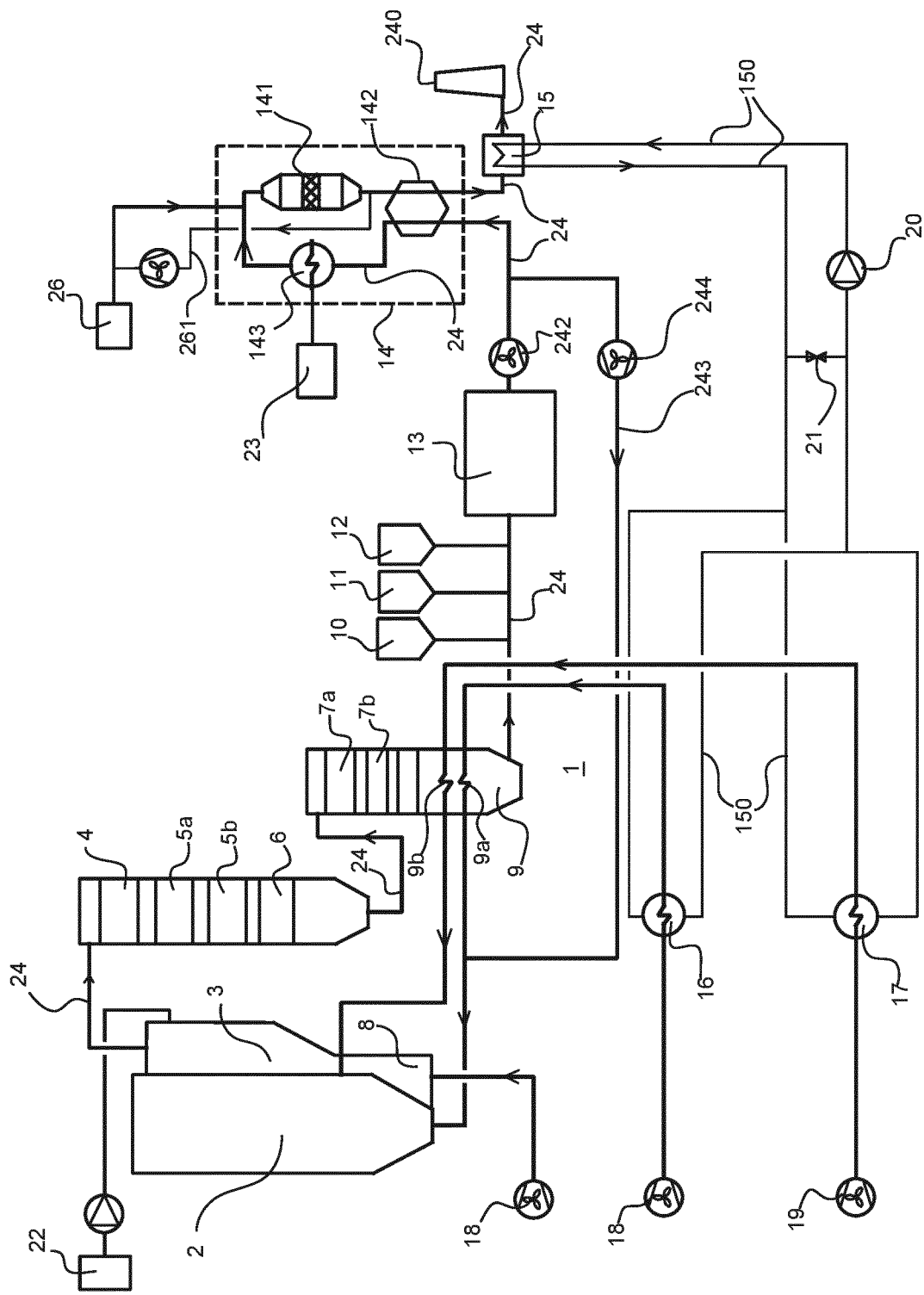

ARRANGEMENT FOR AND A METHOD OF OPERATING A STEAM BOILER SYSTEM

TECHNICAL FIELD

The present invention relates to an arrangement for a steam boiler system 1. The present invention also relates to a method of operating a steam boiler system.

BACKGROUND ART

Nitrogen oxides (NOx) are gaseous pollutants emitted during the combustion process in a combustor or a furnace of a boiler. The flue gas or exhaust gas resulting from a combustor, such as a circulating fluidized bed (CFB) combustor is released to the atmosphere and, thus, it is an evident conclusion that the emissions of the exhaust gases including pollutants, such as NOx, SOx, etc., should be minimized, and the gases do not contain substantially any unburned material. The primary nitrogen pollutants produced by combustion are nitric oxide (NO) and nitrogen dioxide ($NO_2$). NOx is formed from the fuel combustion in a combustor. Fuel nitrogen and nitrogen in air are the main sources of the pollutant formed at a temperature of 800 to 950° C. in a combustor. Since NOx is an atmospheric pollutant, regulations call for limiting its emission level into the atmosphere. They contribute to acid rain and ozone formation, visibility degradation, and human health concerns. Emissions from the combustion sources are therefore regulated and monitored. As a trend the emission requirements are increasingly becoming more stringent.

With current and proposed emission regulations, it is commonplace to use NOx controls to achieve the lowest emission levels possible. Post-combustion reduction techniques include selective catalytic reduction (SCR) and selective noncatalytic reduction (SNCR). In both technologies, NOx is reduced to nitrogen ($N_2$) and water ($H_2O$) through a series of reactions with one or more reagents injected into the flue gas. The most common reagents used are ammonia and urea for both SCR and SNCR systems.

A Selective Non-Catalytic Reduction (SNCR) procedure involves the use of a reducing agent, such as ammonia ($NH_3$) or urea ($CO(NH_2)_2$) as an additive to be injected into the exhaust gases of a boiler system. These additives are injected into the hot exhaust gas stream at a temperature window of 750 to 950° C., at a nominal NH/NO molar ratio in excess of one, while maintaining the $NH_3$ slip at reasonably low levels. The NOx reduction is achieved by the following reactions:

Ammonia net reaction: $NH_3+NO+\frac{1}{4}O_2\text{->}N_2+3/2H_2O$

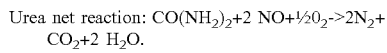

Urea net reaction: $CO(NH_2)_2+2 NO+\frac{1}{2}O_2\text{->}2N_2+CO_2+2 H_2O$.

The NOx reduction efficiency with the SNCR-method generally ranges from about 20 to about 80%.

A Selective Catalytic Reduction (SCR) process involves a catalytic reaction of NH 3 and NOx in the presence of a catalyst, such as vanadium pentoxide supported on a titanium dioxide substrate. NH 3 is injected upstream of the SCR catalyst and reduces NOx to nitrogen and water as the gases flow through the catalyst grid. The reaction temperature for NOx removal is much lower than the SNCR, in the range of 200 to 500° C. The SCR process is highly efficient in removing NOx, and over 90% of the NOx may be removed through this process. The net reaction of the process is:

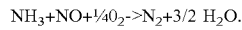

$NH_3+NO+\frac{1}{4}O_2\text{->}N_2+3/2 H_2O$.

It is currently the most effective method of post-combustion NOx reduction and has been applied to a variety of fuels (such as, natural gas, refinery gas, bituminous, subbituminous and lignite coals, fuel oils, petroleum coke, biomass and waste/waste wood).

In general, at steam boiler systems there are three basic SCR system configurations: a high dust configuration with the SCR reactor between the economizer and air preheater, a low dust configuration with the SCR reactor after particulate control devices, and a tail-end configuration with the SCR reactor after the flue gas desulfurization (FGD) system. Generally, an SCR reactor has to be operated in a certain temperature range to function properly and in an environment that does not deteriorate the catalyst material or its structure. In the hot side/high dust installation, the SCR system is typically installed at the economizer outlet, preceding an air preheater. This enables conveniently the achievement of the ideal gas temperature for NOx reduction, which is between 371 to 399° C. In the cold side/low dust installation, the SCR system is typically installed after the air preheater and particulate collection. In such systems, the SCR system needs to include a method to increase the flue gas temperature.

A prior art document International Publication WO 2011/135518 A2 discloses a circulating fluidized bed combustor arrangement that includes (a) a circulating fluidized bed reactor in which (i) a furnace combusts a fuel material in a suspension of solid particles of a circulating fluidized bed, (ii) a first cyclone separator arrangement receives a mixture of gases and solid particles from the furnace for separating a first fraction of the solid particles from the exhaust gases, and (iii) a solid particle return system connected to the first cyclone separator returns separated solid particles to the furnace, (b) a heat transfer section including a water/steam heat exchanger section arranged after the first cyclone separator arrangement in the exhaust gas channel, (c) a heat recovery device provided in connection with the furnace, the first cyclone separator arrangement and the heat transfer section being arranged for recovering heat resulting from the combustion process in the furnace, (d) a selective catalytic reduction system arranged in the exhaust gas channel, after the heat transfer section, for removing NOx from the exhaust gas, (e) a device for injecting NOx reducing agent into the exhaust gases upstream of the selective catalytic reduction system, and (f) a second cyclone separator arrangement provided downstream of the first cyclone separator arrangement and upstream of the heat transfer section, in which a second fraction of the solid particles is separated from the exhaust gases.

Several potential problems may be avoided with the arrangement described above. That arrangement provides a more reliable operation of the CFB combustor, e.g., because catalyst plugging due to a high dust load and alkalinity of ash may be eliminated or considerably reduced. With that arrangement, it is also possible to minimize ash deposits that react with ambient moisture and develop hard deposits and acidity, thereby damaging the base material of the catalyst grid. Also, permanent plugging of the channels and pores may be avoided and/or the lifetime of the SCR catalysts is considerably increased.

A prior art document U.S. Pat. No. 7,021,248 B1 discloses a system for NOx reduction via SCR with variable boiler load. Since SCR reactions take place within a required temperature range, the SCR reactors are typically located downstream of the economizer flue gas outlet of a steam generator boiler and upstream (with respect to a direction of flue gas flow) of any air heater devices used to preheat the incoming combustion air. For economic reasons, the desired gas temperature entering the SCR reactor should be maintained in the required range at all loads, from full load down to partial loads. Also, maintaining the desired flue gas temperature reduces the formation of ammonia and/or sulphate salts within or on the ammonia injection system and the catalyst. However, as boiler load decreases, the boiler exit gas temperature will drop below the optimal temperature range. To increase the gas temperature to the required temperature range while minimizing the impact on full load thermal efficiency, current practice has been to use an economizer gas bypass flue. The economizer gas bypass flue is used to remove some of the hotter flue gases upstream of the economizer, and then recombine the hotter flue gas with cooler flue gas that leaves the economizer thereby raising the overall flue gas temperature. By controlling the amount of gas that flows through the bypass system, the flue gas temperature entering the SCR reactor can be maintained within the required temperature range at the lower boiler loads. The document presents a system for removing waste heat and nitrogen oxides from boiler flue gas using a split economizer arrangement having a first economizer upstream of a selective catalytic reduction reactor and a second economizer downstream of the reactor. In one embodiment, the flue gas is preferably directed upwardly through the first economizer in a cross co-current heat exchange relationship with boiler feedwater flowing upwardly within the economizer tubes. The first economizer cools the flue gas to a temperature range needed for efficient removal of nitrogen oxides by catalyst in the reactor. A second economizer, downstream of the selective catalytic reduction reactor further heats boiler feedwater and cools the flue gas, thereby improving thermal efficiency.

A prior art document U.S. Pat. No. 6,395,237 B1 discloses one embodiment of a combination of a CFB reactor or combustor and an SCR system. The combination comprises a CFB reactor enclosure for conveying a flow of flue gas/solids therethrough, primary particle separator means for separating solids particles from the flow of flue gas/solids, and means for returning the solids particles collected by the primary particle separator means to the reactor enclosure. At least one of superheater and reheater heat transfer surface is located downstream of the primary particle separator means with respect to the flow of flue gas/solids. Multicyclone dust collector means, located downstream of the at least one of superheater and reheater heat transfer surface, are provided for further separating solids particles from the flow of flue gas/solids, together with means for returning the solids particles collected by the multicyclone dust collector means to the reactor enclosure. An SCR system is located downstream of the multicyclone dust collector means for removing NOx from the flow of flue gas/solids, and dry scrubber means is located downstream of the SCR system. Finally, means are provided for injecting ammonia into the flow of flue gas/solids upstream of the SCR system to cause the chemical reactions which reduce the NOx emissions.

The present invention relates to a boiler plant comprising a furnace wherein fuel and air are introduced so as to combust the fuel with the air to form hot flue gas comprising NOx, a flue gas channel, i.e., flow path for leading the flue gas to a stack, heat transfer surfaces in the flue gas channel and/or in the furnace for generating high-pressure steam, an air preheater in the flue gas channel that transfers heat from the flue gas to the air to be combusted, a flue gas desulfurization system and a final particulate control device downstream of the air preheater, and a tail-end SCR reactor arranged downstream of the flue gas desulfurization system and the final particulate control device. Thus, with the present configuration, the SCR reactor is essentially in a dust- and sulfur-free environment but its temperature is, without reheating of the flue gas, generally below the acceptable range. This means that reheating of the flue gas is required, which increases the operational costs of the SCR reactor. A tail-end configuration may be needed for certain fuels and/or, especially, in some retrofit applications, due to space limitations. Because there is less fly ash, catalyst poisons, and $SO_2$ in the flue gas for tail-end units, the catalyst lifetime may be significantly increased, and less expensive catalyst may be used.

A known method to reheat the flue gas is to pass the flue gas over a high-pressure steam coil heat exchanger upstream of the SCR reactor, and to arrange a gas-gas heat exchanger to transfer heat from flue gas after the SCR reactor to the flue gas upstream of the steam coil heat exchanger. This arrangement decreases the required heating with the stem coil heat exchanger and lowers the stack gas temperature to acceptable levels.

The above described configuration involves the problem of relatively high consumption of high-pressure steam for reheating the flue gas upstream of the SCR reactor. Moreover, the temperature of the flue gas conveyed from the gas-gas heat exchanger to the stack may still be relatively high.

Also, a challenge that remains to be solved is that, in the cold side/low dust installation, the temperature of the flue gas depends on load and fuel conditions as well as the environment temperature. Problems such as ammonia slip, high $SO_3$-conversion rate and low efficiency of denitration of an SCR system are currently associated with too low temperature.

In the context of the present invention, the following terms are used to facilitate the description:

The selective catalytic reduction (SCR) system means an entity comprising at least the actual SCR reactor, but also, the auxiliary systems that may be urea/ammonia vaporizing and injection devices, internal heating devices, etc.

The air preheater means a heat exchanger configured to heat the incoming or inlet air needed for combustion including a primary air and/or a secondary air, if these are separate air streams. The air preheater here is configured to transfer the heat directly from flue gas to the incoming air as a gas-gas -heat exchanger.

The flue gas refers to the combustion exhaust gas produced at furnace of a steam boiler. Its composition depends on what is being burned, but it will usually comprise mostly nitrogen (typically, more than two-thirds) derived from the combustion of air, carbon dioxide ($CO_2$), and water vapor as well as excess oxygen (also derived from the combustion air). It further contains a small percentage of a number of pollutants, such as particulate matter (like fly ash, soot, fluid bed material, etc.), carbon monoxide, nitrogen oxides, and sulphur oxides.

Inlet air means here generally the air intended to participate in combustion. In connection with certain type of combustion devices it may be further specified to be primary air or primary combustion air or secondary air or secondary combustion air.

An object of the invention is to improve the efficiency of a steam boiler system. Especially, an object is to improve the efficiency in a system when an SCR system is applied as a tail-end SCR after a dry sorbent injection (DSI) and a filter baghouse to increase the lifetime of SCR catalysts in the SCR reactor. Further, the system is configured to use steam to adjust the flue gases to a proper temperature of 200 to 260° C. for NOx reduction and depending on required temperature, the steam for flue gas heating would to be taken either from turbine extraction or from the main steam line, which would reduce the electric output and/or net heat rate of the plant comprising the steam boiler system.

A further object of the invention is to reduce the need of steam to heat the flue gas just before entering the SCR reactor to ensure that the temperature of the flue gas is maintained at an adequate temperature range suitable for SCR reduction for variety of boiler loads.

Disclosure of the Invention

Objects of the invention can be met substantially as is disclosed in the independent claims and in the other claims describing more details of different embodiments of the invention. According to the present invention, a heat exchanger is arranged in the flue gas channel downstream of a SCR systems gas-gas heat exchanger, to transfer heat from the flue gas to a heat transfer medium in a heat transfer circuit so as to cool the flue gas conveyed from the gas-gas heat exchanger to the stack, wherein the heat transfer circuit comprises a second heat exchanger, a preliminary air heater, to transfer heat from the heat transfer medium to the air upstream of an air preheater.

Because the air is heated by the heat transfer medium before the air enters into the air preheater, i.e., before heat is transferred from the flue gas to the air, the temperature of the flue gas passing the air preheater decreases less, and the flue gas is conveyed to the SCR reactor at a higher temperature. Thus, the need for reheating the flue gas with high-pressure steam upstream of the SCR reactor is decreased. Thereby, the output of high-pressure steam and the efficiency of the boiler plant is increased.

One aspect of the present invention is to control the flue gas temperature in such a way that the temperature would be optimal for each phase along the flue gas path until release to the atmosphere. After combustion, the heat energy is recovered from the flue gas at superheaters, economizers and air preheaters but after those heat recovery process steps the flue gas temperature is to be controlled from different perspective. Downstream from there on the emission control perspective is the decisive one. Another aspect of the invention is to have the flue gas temperature at a range of about 160 to 170° C. after those heat recovery processes to make sure that a dry sorbent injection (DSI) systems together with the fabric filter baghouse works efficiently regarding emission controls. In terms of materials/chemicals selection for the DSI (economical alternatives such as CaOH may be used) and fabric filter baghouse this 160 to 170° C. is a desirable temperature range. Further, this efficient removal of particulate matter and sulphur content from the flue gas before the SCR system both extend the lifetime of the SCR catalysts and the whole reactor significantly and it further improves the NOx reduction because the catalyst surfaces remain at a better condition.

Further, the flue gas temperature should not go too low since the minimum temperature for SCR is about 200° C. Thus, the optimum temperature required by the DSI and fabric filter baghouse is lower than the minimum temperature required for SCR. In some of the prior art configurations having a tail-end SCR-system, the flue gas temperature adjustment for SCR have be done with steam coil heater using the high pressure and temperature steam either from turbine extraction or from the main steam line. If the required increase in temperature with the steam coil would be significant, that would decrease the calculated net efficiency of the steam boiler plant because the same steam could be used for the actual power generation, not for emission control systems.

On the combustion air inlet side, the conventional way is to use air preheaters that take the heat from the flue gas downstream next to economizers. Depending on the fuel, in general, it is needed to keep the air inlet temperature before such air preheater high enough, at about 60 to 70° C., to avoid air preheater corrosion and, previously, steam has been used for that heating purpose. To meet the above presented slightly contradictory demands, one aspect of the present invention is that the use of steam is reduced by providing at least one heat exchanger located in the flue gas channel after the SCR system, the heat exchanger is configured to transfer heat, when in use, from the flue gas downstream of the SCR system to a fluid medium in a fluid circuit, the fluid circuit comprises at least one pump configured to lead the fluid medium to preliminary air heaters configured to heat the inlet air before entering to the air preheater. As a consequence of this arrangement, the air temperature entering the air preheater is higher and that causes that less heat is taken out from the flue gas at that point. That causes slightly higher temperature of the flue gas entering the DSI and fabric filter baghouse and further to the SCR system requiring less re-heating with the steam. So, finally, as the heat has been taken with the heat exchanger from the flue gas just upstream of the stack, the temperature of flue gas exiting the stack is reduced. Also, the net heat ratio of the whole steam boiler plant is improved.

Thus, with the present arrangement, the flue gas temperature can be partially controlled with the temperature of inlet air by controlling the preliminary air heater. The inlet air upstream of furnace such as a fluidized bed is heated in two phases. In the first phase with the heat available from flue gas after the SCR system and, then, in the second phase with the heat available from flue gas after the economizers but before entering the SCR system, by the air pre-heater. Because the first phase already raises the temperature of inlet air, the relative portion of heat transferred to the inlet air from second phase decreases and the outcome is that less steam is needed to adjust the temperature of flue gas entering the SCR system. In other words, when the inlet air enters the air preheater in higher temperature (~100 to 110° C.) than normally (60 to 70° C.). Also, the air preheater flue gas exit temperature increases and thus less steam is required at tail-end SCR system. This means that less steam heating is required for flue gas entering the SCR system to have SCR-process working properly at a desirable temperature.

According to an embodiment of the invention, the flue gas temperature after tail-end SCR is still reasonably high and flue gases are mainly free of dust and acid gases ($SO_2$, HCl). The heat can be recovered to combustion air with indirect method, i.e., by means that the fluid medium in the fluid circuit is pressurized water. The heat exchanger is configured to transfer the heat from the flue gas downstream the SCR system to a fluid medium in a fluid circuit, such as a closed circulation water loop. The fluid circuit transfers the heat to a water coil of a preliminary air heater. In some prior art configurations, there has been a steam coil air preheaters in the air channel to heat the air before it enters the actual air preheaters. For example, U.S. Pat. No. 4,205,630 relating to a pulverized fuel fired steam generator discloses a steam air heater disposed in the combustion air intake duct between the forced draft fan and the main flue gas heated air preheater for raising the temperature of the combustion air entering the main air preheater. It is known in the prior art to utilize a steam air heater so disposed to raise the temperature of the combustion air entering the main air preheater on pulverized fuel steam generators during low load operation in order to limit the corrosion of the cold end heat transfer surfaces on the main air preheater. These conventional steam coil air preheaters are no longer needed in this present configuration to preheat the air before the flue gas operated combustion air preheater to a temperature (60 to 70° C.) to avoid corrosion.

With the present method, the temperature of the flue gas upstream of the SCR reactor is controlled by controlling the temperature difference of flue gas over the air preheaters by adjusting the temperature of the inlet air with preliminary air heaters prior to the air preheaters. As the air preheaters transfer heat from the flue gas to the inlet air for combustion, the temperature difference between these two flows determines how much heat may be transferred if the parameters such as physical construction and these two flows remain constant. Flue gas flow is the high temperature flow transferring heat to the cooler inlet air flow. If the temperature of the inlet air flow is already increased, the capability of the inlet air to cool down the flue gas temperature is less. Thus, the temperature of the flue gas remains higher if the inlet air is hotter. This effect is now utilized here to reduce the usage of steam in steam coil heater to heat up again the flue gas temperature for optimal performance of NOx reduction in the SCR reactor.

There are clear practical advantages obtained by the specific elements:
   Water coil heaters may be used for preliminary heating of intake combustion air before actual air preheaters. When heat is recovered from flue gases after tail-end SCR, less steam is consumed.
   Steam boiler system exit flue gas temperature and tail-end SCR steam consumption can be controlled with circulation water loop by-pass control to optimize also the fabric filter baghouse operation.
   Even a 40% reduction in tail-end SCR steam consumption may be achieved,
   Overall steam consumption reduced by >65%.
   Due to relatively high circulation water loop temperature (110 to 130° C.) and dust/sulphur/acid gas free environment, normal carbon steel and finned tubes can be used for the heat exchangers recovery tube banks transferring the heat from the flue gas after the SCR system.

According to one aspect of the invention, the intake air comprises separate air streams, a primary air stream and a secondary air stream for different locations at the furnace. This depends on an actual configuration of the boiler system in question, whether it is a circulating fluidized bed boiler or a bubbling bed boiler or some other type of furnace. According to an embodiment of the invention, the steam boiler system is a fluidized bed boiler system such as a circulating fluidized bed boiler system or a bubbling fluidized bed boiler system. The preliminary air heaters are configured to heat primary and/or secondary air upstream of primary and/or secondary air preheaters.

According to one aspect of the invention, when in operation, the heat exchanger transfers heat from the flue gas, such as in an exemplary set-up, by cooling the flue gas downstream of the SCR system from 183° C. to 135° C. The fluid medium, such as pressurized water, is thereby heated from 110° C. to 123° C. This heat is then further conveyed by the pump system to the preliminary air heaters that are configured to heat the inlet air, such as primary and/or secondary air, with the fluid medium. In this exemplary set-up, the primary air is heated from 49° C. to 103° C. and secondary air is heated from 41° C. to 103° C. while the fluid medium will be cooled from 123° C. to 110° C. due to the heat transfer in the preliminary air heaters.

According to one aspect of the invention, heating the inlet air, i.e., the heated primary and/or secondary air has a consequence that the temperature of flue gases entering the fabric filter baghouse would increase. In an exemplary set-up the flue gas temperature upstream of the fabric filter baghouse would be at 168° C. and downstream the fabric filter baghouse the temperature would be at 173° C. when entering the SCR system. The 173° C. temperature is reasonably close to the effective operating temperature (200° C.) of the SCR reactor and, thus, less steam from the boiler will be needed to heat the flue gas before it enters the SCR reactor.

According to an embodiment of the invention, the SCR system comprises, in addition to an actual SCR reactor, the gas-gas heat exchanger (internal to the SCR system) for heating the flue gas entering the SCR reactor with the flue gas exiting the SCR reactor and further, a steam coil heater for heating the flue gas entering the SCR reactor with steam from the main steam line or from the auxiliary steam system. Advantageously, the steam coil heater is controlled such that steam is allowed at the steam inlet only the amount which is required to heat the flue gas to a target temperature.

In the method of operating a boiler plant according to the one aspect of the invention, the heat exchanger located downstream the SCR system in the flue gas flow direction is used for transfer of heat from the flue gas exiting the SCR system to a fluid medium, and a fluid circuit for the fluid medium comprising at least one pump is used to lead the fluid medium to water, preliminary air heaters that are configured to heat the primary and/or secondary air with the fluid medium.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features that are considered as characteristic of the invention are set forth in particular in the appended claims.

BRIEF DESCRIPTION OF DRAWINGS

In the following, the arrangement for a power plant boiler system is explained in more detail in the following by way of the exemplary embodiments and as shown in the attached drawing in the sole FIG. 1 that shows components of a steam boiler system. The invention will be described with reference to the accompanying exemplary, schematic drawings, in which FIG. 1 illustrates an arrangement for a power plant boiler system according to an embodiment of the invention.

DETAILED DESCRIPTION OF DRAWINGS

FIG. 1 depicts schematically an arrangement for a steam boiler system 1, which is illustrated as a circulating fluidized bed boiler system. The circulating fluidized bed boiler system 1 is operated preferably so that fuel material is combusted in a furnace 2 in a suspension of solid particles of a circulating fluidized bed. The exhaust gases resulting from the combustion and solid particles are passed from the furnace 2 to at least one solids separator 3 and a first fraction of solids particles are separated in the at least one solids separator 3 and are returned back into the furnace 2 via a solids return leg. A selective non-catalytic reduction (SNCR) system 22 is configured as an early stage of NOx reduction downstream of furnace 2 and solids separator 3. In other words, the figure presents an arrangement for a steam boiler system 1 comprising a furnace 2 and along a following flue gas channel 24 a number of superheaters 4, 5a, 5b, a number of economizers 6, 7a, 7b and at least one air preheater 9 located in the flue gas channel 24 downstream of the economizers 6, 7a, 7b, a fabric filter baghouse 13 located in the flue gas channel 24 downstream of the air preheater 9, 9a, 9b, and downstream of the fabric filter baghouse 13 is located a selective catalytic reduction (SCR) system 14 comprising an SCR reactor 141, a high pressure steam coil heater 143 upstream of the SCR reactor 141 and a regenerative a gas-gas heat exchanger 142 connected upstream and downstream of the SCR reactor 141 to transfer heat from flue gas after the SCR reactor 141 to the flue gas upstream of the high pressure steam coil heater 143. In other words, that one (inlet) end of the gas-gas heat exchanger is located upstream the SCR reactor 141 and other (outlet) end of the gas-gas heat exchanger 142 is located downstream the SCR reactor 141.

In FIG. 1, a section along the flue gas channel 24 downstream of air preheaters 9, 9a, 9b comprises the flue gas emission control systems. The emission control system comprises a dry sorbent injection (DSI) system that provides additives, such as hydrated lime, bicarbonate and/or active carbon to the flue gas. As it is illustrated in the FIG. 1, there are provided three dry sorbent silos 10, 11, 12 for the purpose. The actual configuration of the DSI and its silos 10, 11, 12 depends on number of parameters. In this case, when temperature is low enough, both hydrated lime or bicarbonate can be used as an additive. In case of higher temperature, hydrated lime is no more effective and bicarbonate is the additive that is effective. Then, further in a downstream direction, a fabric filter baghouse 13 is arranged in the flue gas channel 24. Because the flue gas emission control system is located after the air preheater 9, 9a, 9b, the flue gas temperature has been dropped to a proper level for the fabric filter baghouse-type of filter and a need for a more expensive and less effective ESP (the electrostatic precipitator) is no longer there. Also, one advantage is that when the fabric filter baghouse 13 can be used due to the reasonable flue gas temperatures, the dry sorbent injection with hydrated lime, bicarbonate and/or active carbon is much more effective than in ESP and much lower emissions can be reached. No additional wet or semi-dry flue gas desulphurization (FGD) is needed after SCR. ESP itself is less expensive than fabric filter baghouse, but when also some sort of FGD is needed, the combination is more expensive. With the present arrangement, the flue gas is cleaned from the majority of the particulate matter of the combusted fuel and/or other particulate matter before the flue gas enters an SCR system. In some situations, it is needed to recirculate part of the flue gases back to the furnace 2 for combustion and that is why from downstream of the fabric filter baghouse 13 there is configured a flue gas recirculating channel 243 with a flue gas fan 242 to enable this act if necessary, for example in start up phase or like.

The SCR system 14 requires quite a precise flue gas temperature to function properly. That is why the embodiment of FIG. 1 is configured to have a steam-coil heater 143 with a steam inlet 23 and a gas-gas-heat exchanger 142 (preferably of a regenerative type of heat exchanger) located and connected in the flue gas channel both before and after the actual SCR reactor 141. The temperature of the flue gas upstream of the SCR reactor is further controlled with the high pressure steam coil heater 143 and the gas-gas heat exchanger 142. There is also an ammonia feeding system 26 comprising an ammonia inlet and an ammonia vaporized together with a gas blower to get the ammonia properly mixed into the flue gas before the SCR reactor. The ammonia feeding system 26 also comprises an SCR mix gas circulation channel 261 taking a fraction of flue gas from downstream of SCR reactor 141 to the ammonia feeding system 26 so that the mixing can be done in correct temperature and composition. In some situations, it is needed to recirculate part of the flue gases back to the combustion and that is why there is configured a flue gas recirculating channel 243 with a flue gas recirculation fan 244 to enable this act if necessary, for example, in start up phase, or the like. As an emission control overview, a solids separator 3 and the fabric filter baghouse are configured upstream of SCR system 14 to remove the major part of particulate matter from the flue gas to improve the efficiency of the SCR system 14 in NOx reduction.

Still continuing with FIG. 1, there is arranged at least one heat exchanger 15 located in the flue gas channel 24 after the SCR system 14, the heat exchanger 15 is configured to transfer heat, when in use, from the flue gas downstream of the SCR system 14 to a fluid medium in a fluid circuit 150;
the fluid circuit 150 comprises at least one pump 20 configured to lead the fluid medium to preliminary air heaters 16, 17 configured to heat inlet air before entering to the flue gas air preheater 9, 9a, 9b. The fluid circuit 150 may also comprise a valve 21 (preferably a proportional valve) that can be used for controlling the flow and temperature of the fluid medium. That a control valve 21 is arranged in fluid circuit 150 preferably downstream of the pump 20 to control the flow to the preliminary air preheaters 16, 17. If the valve 21 is in its full open position, it means that the flow by-passes the preliminary air heaters 16, 17. If the valve 21 is fully closed, it means that all available heat is being transferred to the preliminary air heaters 16, 17. In the fluid circuit 150, there is a pump 20 connected to lead the fluid medium to preliminary air heaters 16, 17 that are configured to heat the primary and/or secondary air with the fluid medium. A number of primary air fans 18 are arranged to provide sufficient amount of primary air for combustion at the furnace 2 or fluidized bed 2, similarly, a number of secondary air fans 19 are fans are arranged to provide sufficient amount of secondary air. Further downstream the flue channel 24 ends at exit 240 such as a chimney 240 or alike.

In a calculated example of a method of operating a power plant boiler system according to the invention, a heat exchanger 15 was located in the flue gas channel 24 downstream of the SCR system 14 and configured to collect heat to a fluid medium from the flue gas exiting the SCR system 14. With a reduction of flue gas temperature of 12° C. and by transferring the heat with fluid medium via a fluid circuit 150 to the preliminary air heaters 16, 17, to get the SCR operation temperature to the same level as would be done with a steam coil heater, the auxiliary steam consumption was reduced by almost 67% and the power plant fuel consumption was reduced 1.9%. This 1.9% reduction in fuel consumption is about the same as an improvement in net efficiency.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such a combination is technically feasible.

The invention claimed is:

1. An arrangement for a steam boiler system, the arrangement comprising:
   a furnace;
   a number of superheaters along a flue gas channel that follows the furnace;
   a plurality of economizers;
   at least one air preheater located in the flue gas channel downstream of the economizers;
   a fabric filter baghouse located in the flue gas channel downstream of the at least one air preheater;
   a selective catalytic reduction (SCR) system downstream of the fabric filter baghouse, the SCR system comprising an SCR reactor, a steam coil heater upstream of the SCR reactor and a gas-gas heat exchanger connected upstream and downstream of the SCR reactor to transfer heat from flue gas after the SCR reactor to the flue gas upstream of the steam coil heater; and
   at least one heat exchanger located in the flue gas channel after the SCR system, the heat exchanger being configured to transfer heat, when in use, from the flue gas downstream of the SCR system to a fluid medium in a fluid circuit, the fluid circuit comprising at least one pump configured to lead the fluid medium to preliminary air heaters configured to heat inlet air before entering the flue gas air preheater.

2. The arrangement according to claim 1, wherein the preliminary air heaters are configured to heat at least one of primary air and secondary air upstream of at least one of primary and secondary air preheaters.

3. The arrangement according to claim 1, wherein the fluid medium in the fluid circuit is pressurized water.

4. The arrangement according to claim 1, further comprising a control valve arranged in fluid circuit downstream of the pump to control the flow to the preliminary air preheaters.

5. The arrangement according to claim 1, wherein the SCR system comprises the gas-gas heat exchanger for heating the flue gas entering the SCR reactor with the flue gas exiting the SCR reactor.

6. The arrangement according to claim 1, wherein the steam coil heater is configured to heat the flue gas entering the SCR reactor with steam from the main steam line or from the auxiliary steam system.

7. The arrangement according to claim 1, wherein a solids separator and the fabric filter baghouse are configured upstream of SCR system to remove a major portion of particulate matter from the flue gas to improve the efficiency of the SCR system in NOx re-duction.

8. A method of operating a steam boiler system, the method comprising:
   providing a furnace;
   providing a plurality of superheaters;
   providing a flue gas channel following the plurality of superheaters;
   providing a plurality of economizers and at least one air preheater located in the flue gas channel downstream of the economizers;
   providing a fabric filter baghouse in the flue gas channel downstream of the air preheater;
   locating a selective catalytic reduction (SCR) system downstream of the filter baghouse, the SCR system comprising an SCR reactor, a steam coil heater upstream of the SCR reactor;
   connecting a gas-gas heat exchanger upstream and downstream of the SCR reactor to transfer heat from flue gas after the SCR reactor to the flue gas upstream of the steam coil heater;
   locating at least one heat exchanger in the flue gas channel after the SCR system, the heat exchanger transferring heat, when in use, from the flue gas downstream of the SCR system to a fluid medium in a fluid circuit;
   leading the fluid medium to preliminary air heaters by the fluid circuit; and
   heating inlet air before entering to the flue gas air preheater.

9. The method of claim 8, wherein the preliminary air heaters heat at least one of primary combustion air and secondary combustion air upstream of at least one of primary air preheaters and secondary air preheaters.

10. The method according to claim 8, further comprising steps of heating primary combustion air in two steps, first with the preliminary air heater delivering heat from the flue gas after SCR system, raising the primary combustion air temperature to a range of 100±10° C.; and
    then, in a second step, heating the primary air in the air preheater transferring the heat from the flue gas downstream of the economizers.

11. The method according to claim 8, further comprising steps of heating secondary combustion air in two steps, first with the preliminary air heater delivering heat from the flue gas after SCR system, raising the secondary combustion air temperature to a range of 100±10° C.; and
    then, in a second step, heating the secondary air in the preheater that transfers the heat from the flue gas downstream of the economizers.

12. The method according to claim 8, further comprising controlling the temperature of the flue gas upstream of the SCR reactor by controlling the temperature difference of flue gas over the air preheaters by adjusting the temperature of the combustion air with the preliminary air heaters prior to the air preheaters.

13. The method according to claim 8, wherein an SNCR system is configured as an early stage of NOx reduction downstream of the furnace and the solids separator.

14. The method according to claim 8, wherein the fluid medium is pressurized water in a temperature range of 100 to 140° C.

15. The method according to claim 8, further comprising controlling the temperature of the flue gas upstream of the SCR reactor with the steam coil heater and the gas-gas heat exchanger.

* * * * *